(12) United States Patent
Utsumi et al.

(10) Patent No.: US 8,208,099 B2
(45) Date of Patent: Jun. 26, 2012

(54) TRANSMISSIVE TYPE LIQUID CRYSTAL DISPLAY COMPRISING A MAIN PIXEL REGION HAVING A FIRST COLOR FILTER AND A SUB-PIXEL REGION HAVING A SECOND COLOR FILTER HAVING A HIGHER TRANSMITTANCE

(75) Inventors: Yuka Utsumi, Hitachi (JP); Tsunenori Yamamoto, Hitachi (JP); Kikuo Ono, Mobara (JP)

(73) Assignees: Hitachi Displays, Ltd., Chiba-ken (JP); Panasonic Liquid Display Co., Ltd., Hyogo-ken (JP)

( * ) Notice: Subject to any disclaimer, the term of this patent is extended or adjusted under 35 U.S.C. 154(b) by 379 days.

(21) Appl. No.: 11/514,227

(22) Filed: Sep. 1, 2006

(65) Prior Publication Data

US 2007/0058115 A1   Mar. 15, 2007

(30) Foreign Application Priority Data

Sep. 12, 2005 (JP) ................................ 2005-263295

(51) Int. Cl.
G02F 1/1335 (2006.01)
G02F 1/1343 (2006.01)
(52) U.S. Cl. .................... 349/109; 349/108; 349/141
(58) Field of Classification Search .......... 349/106–109, 349/141, 144, 145
See application file for complete search history.

(56) References Cited

U.S. PATENT DOCUMENTS

| | | | | |
|---|---|---|---|---|
| 5,642,176 | A | * | 6/1997 | Abukawa et al. ............. 349/106 |
| 5,644,415 | A | * | 7/1997 | Aoki et al. .................... 349/122 |
| 5,899,550 | A | * | 5/1999 | Masaki ......................... 349/109 |
| 6,888,604 | B2 | * | 5/2005 | Rho et al. ..................... 349/146 |
| 7,486,351 | B2 | * | 2/2009 | Itou et al. ........................ 349/99 |
| 7,545,466 | B2 | * | 6/2009 | Lee ............................... 349/114 |
| 2002/0018166 | A1 | * | 2/2002 | Matsumoto et al. ......... 349/141 |
| 2002/0126238 | A1 | * | 9/2002 | Matsushita et al. .......... 349/106 |
| 2004/0095521 | A1 | | 5/2004 | Song et al. |
| 2004/0109103 | A1 | | 6/2004 | Ota et al. |

FOREIGN PATENT DOCUMENTS

| | | |
|---|---|---|
| JP | 9-97017 | 4/1997 |
| JP | 10-123501 | 5/1998 |
| JP | 2004-004822 | 1/2004 |
| JP | 2004-78102 | 3/2004 |
| JP | 2005-25002 | 1/2005 |
| JP | 2005025002 A * | 1/2005 |
| WO | WO99/45430 | 9/1999 |

* cited by examiner

*Primary Examiner* — Mark Robinson
*Assistant Examiner* — Paisley L Arendt
(74) *Attorney, Agent, or Firm* — Antonelli, Terry, Stout & Kraus, LLP (57) ABSTRACT

Provided is a backlit liquid crystal display apparatus having one pixel unit comprising RGB three primary color regions and a white region or a region having low color concentration, so that high brightness can be compatible with color purity. A pixel unit comprises RGB main pixels and G/R sub-pixels. In a lower gray scale, color purity has priority in display with main pixels, while in a higher gray scale, color purity has priority in display with main and sub-pixels, whereby high brightness can be compatible with color purity. Sub-pixels may be consisted only by green sub-pixels.

16 Claims, 9 Drawing Sheets

TRANSMISSIVE TYPE LIQUID CRYSTAL DISPLAY COMPRISING A MAIN PIXEL REGION HAVING A FIRST COLOR FILTER AND A SUB-PIXEL REGION HAVING A SECOND COLOR FILTER HAVING A HIGHER TRANSMITTANCE

FIELD OF THE INVENTION

The present invention relates to a transmissive liquid crystal display apparatus, more specifically to a liquid crystal display apparatus with high transmittance and therefore, capable of easily providing a high-brightness display.

BACKGROUND OF THE INVENTION

A liquid crystal display, compared with current main stream display, i.e., CRT (Cathode Ray Tube), has merits in that it can be manufactured very thin and light. With technical advances in wide viewing angle and motion picture, its applications have been expanded as well.

In recent years, liquid crystal displays have been used extensively for desk top personal computer monitors, monitors mainly for use in printing or designing, and liquid crystal display televisions. With this trend, liquid crystal displays are now faced with new demands such as improved color purity of red, green and blue and superior color reproduction for halftone colors like the color of a person's face. Moreover, liquid crystal displays are required to provide high contrast ratio, expanded dynamic range, and color reproduction covering from high brightness to low brightness.

Conventional liquid crystal displays, however, have a problem that their color tones are easily changed due to changes in brightness (or tones). In case of liquid crystal display televisions, high brightness is particularly a very important attribute required.

To realize high-brightness liquid crystal displays, Japanese Patent Laid-Open No. 2004-4822 discloses a liquid crystal display panel which has a white pixel in addition to the conventional RGB (Red, Green and Blue) pixels in one pixel unit.

COMMENTS ON THE RELATED ART

When a liquid crystal display is used as a TV monitor, high brightness is an important requirement. However, a major problem with conventional liquid crystal displays formed of RGB pixels as one unit pixel is that it cannot increase transmittance to a great extent.

Although it is typical that the liquid crystal display has a red filter, a green filter and a blue filter to express RGB primary colors, a simple calculation reveals that each uses, at most, one third of the light from a light source. Besides, considering that high color purity is additionally required for a liquid crystal display TV, less than one third of the transmitted light is actually used.

Japanese Patent Laid-Open No. 2004-4822 discloses a means for forming a white pixel in addition to RGB three-color pixels. According to this technology, the brightness of white can be enhanced up to 1.5 times. However, this poses another problem that an area assigned to one pixel is reduced due to the formation of a white pixel, leading to deterioration of brightness at the time of displaying RGB colors. If the white pixel is added to the others to maintain brightness, color purity of each color is noticeably reduced. For a TV, reduction in color purity is considered as unpermittable picture quality degradation.

In addition, Japanese Patent Laid-Open No. 2004-4822 discloses a means based on a human's perception, wherein the area of the blue pixel and white pixel is set smaller than the area of the green pixel and red pixel and thus, a slightly yellowish display strongly compensates blue color of the light source, that is, blue is most insensitive to a change in the intensity of radiation.

When the allowance of color nonuniformity is checked, however, it turned out that blue exhibited the smallest allowable color difference while green and red exhibited relatively large allowable color differences. This indicates that blue color is a very important component in picture quality. Moreover, since blue in general is regarded as a luxurious and desirable color by many, it should be treated with much interest.

Meanwhile, because blue light has a short wavelength, a large amount of the blue light gets lost as it transmits through an optical sheet. In addition, because the dichroic ratio of a polarizing plate for the blue light is of a short wavelength region, the loss of the blue light is great. Although the lowered brightness of blue light due to its reduced area may be compensated with emission of the light from the light source, too much light should be used then. Moreover, a light source offering strong blue light illumination lowers emission efficiency, leading to an increase in power consumption.

As explained so far, the cited invention primarily discusses brightness of white display, but does not imply compatibility of brightness and purity of each color and the realization of good picture quality. Therefore, an object of the present invention is to provide a liquid crystal display which enables compatibility of high brightness of white display with brightness of each color and color purity.

SUMMARY OF THE INVENTION

An object of the present invention is to provide a liquid crystal display apparatus featuring high brightness compatible with color purity.

Figure 1:
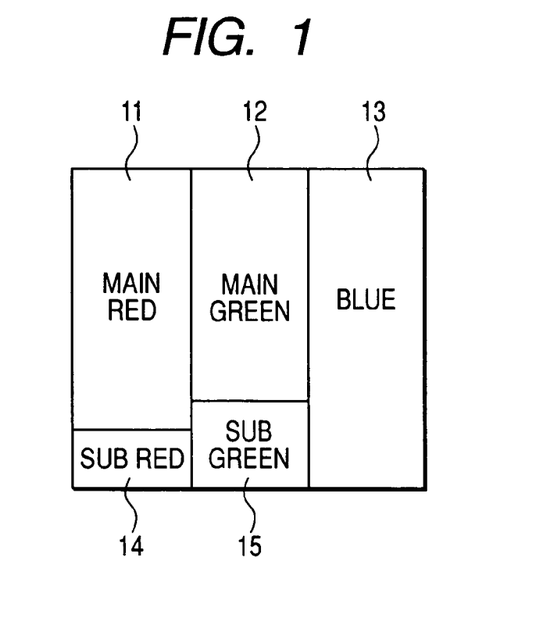
FIG. 1 illustrates a schematic diagram of a pixel configuration according to the present invention.

FIG. 1 is a schematic diagram of a pixel configuration according to the present invention. Means for solving the problems of the present invention will now be explained with reference to the drawing. To achieve the above-described object, red and green pixels according to the present invention are formed in main pixels with high color purity and in sub pixels with high transmittance and low color purity.

A liquid crystal display apparatus of the present invention is constituted by a liquid crystal panel having red and green pixels with sub-pixels and a blue pixel which is a single pixel, and a light source unit disposed at one side of the liquid crystal panel. Here, the light source shows at least a strong emission peak of a light emitting diode (or a cold cathode fluorescent lamp) in the blue wavelength region of 400-490 nm (or 430-480 nm), the green wavelength region of 510-570 nm (or 510-560 nm), and the red wavelength region of 600-700 nm (or 620-680 nm), respectively, and color filters having high transmittance are formed in regions including these peak wavelengths to form RGB pixels.

A color filter in a sub-pixel has transmittances around the emission peak wavelength regions of the light source higher than the respective main pixels. The sub-pixel may be a region where the transmittance does not vary in a specific wavelength, i.e., a colorless region.

One way to increase transmittance of a sub-pixel, color density of a color filter may be decreased, a plurality of microscopic colorless regions may be formed, or total transmittance in each sub-pixel region may be increased. The microscopic colorless regions are formed by removing color filters in the same number as the main pixels using standard photolithography or laser irradiation. To form color filters having high transmittance, a regist with a low pigment density may be used separately, or the film thickness of a color filter in the sub-pixel region may be reduced under particular process conditions such as half-exposure, using a regist same as a main pixel.

In a sub-pixel, electrodes may be configured to have a higher threshold voltage than that of a liquid crystal layer in a main pixel. Thus, by sharing a voltage with the main pixel, the sub-pixel does not need to be driven individually by a transistor or by signal wiring. For instance, in IPS (In-Plane-Switching) mode for forming electrodes on a substrate, tilt angle in the linear electrode plane is set to be smaller than that of the main pixel. Here, the tilt angle is an angle with respect to the edge face of the substrate, that is, an angle for forming multi domains creating a wide viewing angle by controlling the liquid crystal rotation direction.

When the tilt angle of the linear electrode decreases, the threshold voltage shifts to a high voltage side and the transmittance changes sharply by applied voltages. Based on this characteristic for the sub-pixel, in a lower gray scale, color purity of the main pixel has priority in display; while in a higher gray scale, brightness can be enhanced by high transmittance of the sub-pixel.

In the lower gray scale, displaying the main pixels prior to the sub-pixels is desirable when picture quality is taken account of. Since the liquid crystal display is a non-emittive display, its light source is turned on all the time. In the lower gray scale, a little bit of light leaks from originally non-lighted pixels and this affects color purity, leading to color purity degradation. Therefore, in the lower gray scale, it is desirable to display main pixels prior to sub-pixels having low color purity.

As another embodiment, the sub-pixel may be made colorless (white) where the transmittance does not vary in a specific wavelength, in addition to RGB. In this case, although more wirings and transistors are needed to drive the sub-pixels, since they can be driven independently, it becomes possible to control the lower gray scale and the higher gray scale. This can be applied to the vertical alignment method, which has an electrode configuration making it difficult to increase voltage-transmittance characteristic compared with the IPS mode.

The transmissive liquid crystal display apparatus of the present invention has enhanced optical efficiency by increasing transmittance of the liquid crystal panel, while maintaining color purity. In this manner, emission of the light source can be reduced, leading to reduction in power consumption.

In particular, the transmissive liquid crystal display apparatus of the present invention is a normally close mode liquid crystal display in display mode using birefringence of liquid crystal, and is broadly applicable to liquid crystal displays in many diverse fields including liquid crystal display TVs where high brightness and color purity are required.

DETAILED DESCRIPTION OF THE PREFERRED EMBODIMENTS

The following will now describe preferred embodiment(s) of a transmissive liquid crystal display apparatus of the present invention, with reference to accompanying drawings. It is also to be understood that the present invention can be embodied in other specific forms and modifications and is not limited to the embodiments hereafter.

Embodiment 1

Figure 2:
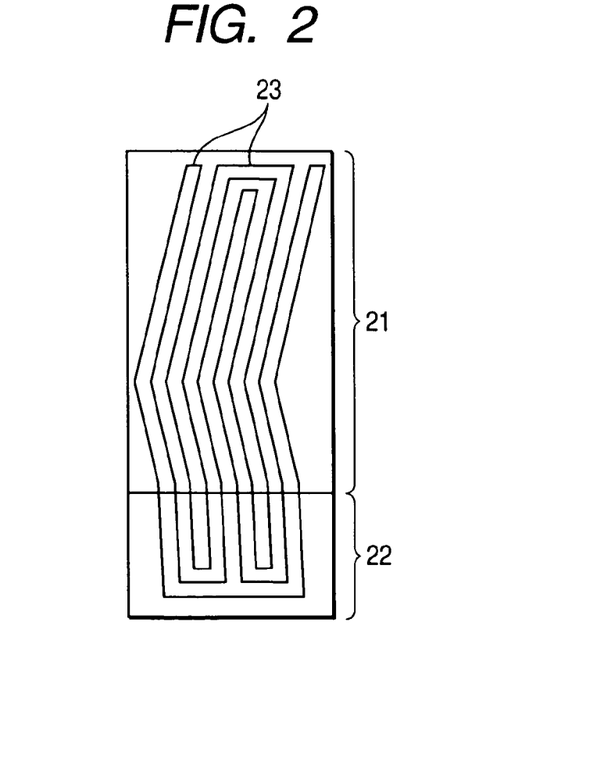
FIG. 2 illustrates a schematic diagram of one embodiment of a pixel electrode configuration of the present invention.
Figure 3:
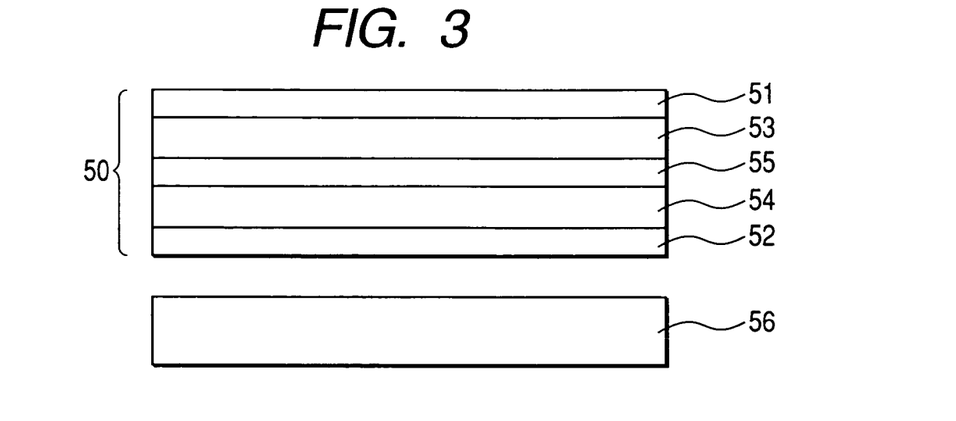
FIG. 3 is a schematic view illustrating one embodiment of a liquid crystal display apparatus according to the present invention.

FIG. 1 and FIG. 2 are schematic diagrams showing one embodiment of a pixel configuration of a liquid crystal display apparatus according to the present invention, and FIG. 3 is a schematic diagram showing one embodiment of a liquid crystal display apparatus according to the present invention.

As depicted in FIG. 3, the liquid crystal display apparatus includes a liquid crystal panel 50, a light source unit 56, and a driving circuit (not shown). The liquid crystal display panel 50 is formed of a pair of polarizing plates 51 and 52 disposed on substrates 53 and 54. Reference numeral 53 is a counter substrate including a color filter, according to this embodiment, composing main pixels and sub-pixels. Reference numeral 54 is a TFT substrate including TFT electrodes for example (the electrodes are not shown).

In IPS mode, an electrode group for applying an electric field to the liquid crystal layer 55 is formed on the substrate 54. Although an organic layer such as an alignment layer or an insulator, and a spacer for maintaining the thickness of the liquid crystal layer are also formed on the substrate, they are not shown in the drawing.

The light source unit 56 installed at one side of the liquid display panel 50 is actually disposed right below the liquid crystal display panel 50, and uses light emitting diode (hereinafter referred to as LED) (not shown). Moreover, the liquid crystal display apparatus includes three optical sheets (not shown), for example, a diffuser, a prism sheet, and a diffusing sheet are formed above the LED. In addition, although not shown in FIG. 3, an optical film for use in optical compensation may be disposed between the substrate and the polarizing plate. The optical film, depending on how optical parameters are set, may be applied to one side only in the case of application in upper and lower sides. These optical parameters are not concerned in the present invention, so they can be set independently. Moreover, brightness enhancing films may also be used as the optical sheet.

Figure 4:
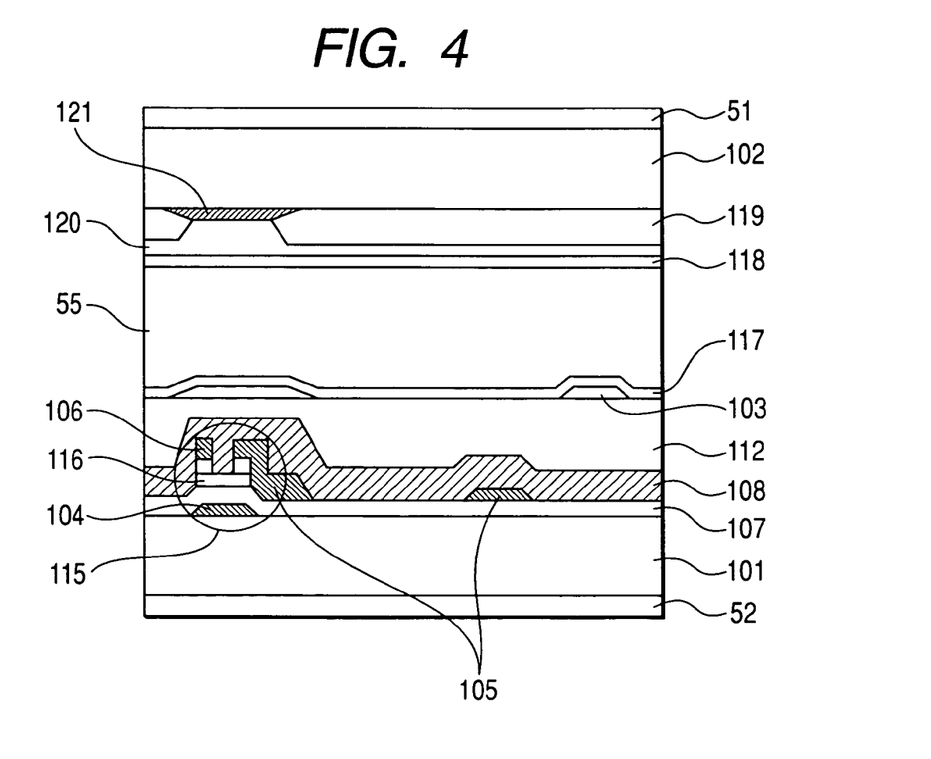
FIG. 4 is a schematic view illustrating one embodiment of a liquid crystal panel according to the present invention.

A fabrication method of the liquid crystal display panel will be briefly explained with reference to FIG. 4. The method described here follows the known procedure, but is not limited thereto though. In fabrication of the liquid crystal display apparatus of this embodiment, 0.7 mm thick alkali-free glass substrates were used for a substrate 101 corresponding to the active matrix substrate 54 and a substrate 102 corresponding to the color filter substrate 53. The thin film transistor formed on the substrate 101 includes a pixel electrode 105, a source electrode 106, a scan electrode 104, and a semiconductor film 116.

First, the scan electrode 104 was formed by patterning an aluminum film, the common electrode wiring (not shown) and the source electrode 106 were formed by patterning chrome films, and the pixel electrode 105 was formed by patterning an ITO film. Other electrodes except for the scan electrode 104 have an electrode wiring line pattern bent in zigzag form. At this time, the flexion angle for the main pixels was set to 15 degrees, and the flexion angle for the sub-pixels was set to 5 degrees.

In addition, electrode materials are not limited to the material introduced in this embodiment. For example, although this embodiment used ITO, any transparent, conductive substances such as IZO or inorganic transparent, conductive substances may be used as the electrode material. Similarly, the present invention is not limited to the metal electrode introduced in this embodiment.

Next, a gate insulator 107 and a protection insulator 108 were formed using silicon nitride, and the film thickness of each was set to 0.3 μm, respectively.

Using photolithography and etching process, a cylindrical shaped through hole of about 10 μm in diameter was formed down to the common electrode wiring, and an acrylic resin was coated thereon. In this way, a transparent organic insulator 112 having insulation characteristics, a dielectric constant of about 4, and a film thickness of about 3 μm was formed by heating at 220° C. for 1 hour.

The through hole portion was etched again to about 7 μm in diameter, and the common electrode 103 was connected to the common electrode wiring and an ITO film were patterned thereon. At this time, the pixel electrode 105 and the common electrode 103 were set apart from each other by 7 μm.

In addition, the common electrode 103 covers the upper portions of the source electrode 106, the scan electrode 104 and the TFT 115, has a grid shape encompassing pixels, and is about 80 μm thick. As a result, an active matrix substrate composed of 1024×3×768 pixels, that is, the source electrode with 1024×3 pixels (corresponding to RGB) and the scan electrode 104 with 768 pixels was obtained.

Next, a black matrix 121 was formed on the substrate 102 using a black regist manufactured by Tokyo Ohka Kogyo Co., Ltd. following standard photolithography which involves coating, pre-bake, exposure, developing, rinsing, and post-bake processes. Even though the film thickness was set to 1.5 μm, it can be adjusted according to a black regist being used so that OD value can be 3 or higher.

Next, a color filter layer 119 was formed using diverse color regists manufactured by Fujifilm Arch Co., Ltd., following standard photolithography which involves coating, pre-bake, exposure, developing, rinsing, and post-bake processes.

For the purpose of planarizing and protecting the color filter layer, an overcoat layer 120 was then formed using V-259 manufactured by Nippon Steel Chemical Co., Ltd. The over coat layer was exposed under high-pressure mercury lamp i-rays at the intensity of 200 mJ/cm$^2$ of light radiation, and heated at 200° C. for 30 minutes. The film thickness on a color pixel ranged from about 1.2 μm to 1.5 μm. This over coat layer is not absolutely required although this embodiment introduced its formation.

Next, a pillar shaped spacer as high as 3.8 μm was formed on the black matrix 121 interposed between blue pixels, by carrying out standard photolithography and etching process on a photosensitive resin. The location of the pillar shaped spacer is not particularly limited by this embodiment and thus, it can be anywhere as needed. In this embodiment, for example, the black matrix 121 was formed on an overlapped region with the scan electrode 104 of the substrate 101 and the respective colors were overlapped between neighboring pixels of different colors. However, the black matrix may be formed in that region also.

A polyamic acid varnish was formed on a TFT substrate 101 and a color filter substrate 102, respectively, by printing, and was heated at 210° C. for 30 minutes to form alignment layers 117 and 118. These alignment layers 117 and 118 made of dense polyimide films of about 100 nm went through a rubbing treatment later. There is no particular limit to materials for the alignment layer by this embodiment, and a diamine such as 2,2-bis[4-(p-aminophenoxy)phenylpropane], a polyimide using pyromellitic dianhydride as an acid anhydride, or a polyimide using paraphenylenediamine or diaminodiphenylmethane as an amine component and aliphatic tetracarboxylic acid dianhydride or pyromellitic anhydride as an acid anhydride component can be used.

Liquid crystals were aligned along the short side of the substrate (the source electrode direction in terms of the TFT substrate). Also, a material providing a liquid crystal alignment function by polarized ultraviolet emission can be used as the material for the alignment layer.

Next, these two substrates were disposed in a manner that the surfaces of the alignment layers 117 and 118 with liquid crystal alignment function thereof were faced with each other, and then a seal member were applied to their peripheral portions to fabricate a liquid crystal display panel. A magnetic liquid crystal composition having a positive dielectric anisotropy of 10.2 (1 kHz, 20° C.) and a refractive index anisotropy of 0.075 (wavelength 590 nm, 20° C.) was injected to the panel under vacuum, and the panel was sealed with a sealing agent made of an ultraviolet setting resin.

Later, two pieces of polarizing plates 51 and 52 were attached to the liquid crystal panel. The transmission axis of the polarizing plate 51 was in parallel to the short side of the liquid crystal panel (the source electrode direction), and the other polarizing plate 52 was disposed orthogonal thereto. In addition, optical compensated polarizers equipped with birefringent films which are capable of compensating optical characteristics, e.g., wavelength dispersion, of the refractive index anisotropy of the polarizing plates or the liquid crystal materials were employed.

By using the optical compensated polarizers, the horizontal electric field type liquid crystal display apparatus exhibits superior wide viewing angle characteristics from the halftone to white display as well as the wide viewing angle characteristics in black display.

Lastly, the driving circuit and the light source unit were connected as a liquid crystal module, and a desired liquid crystal display apparatus was achieved.

Figure 5:
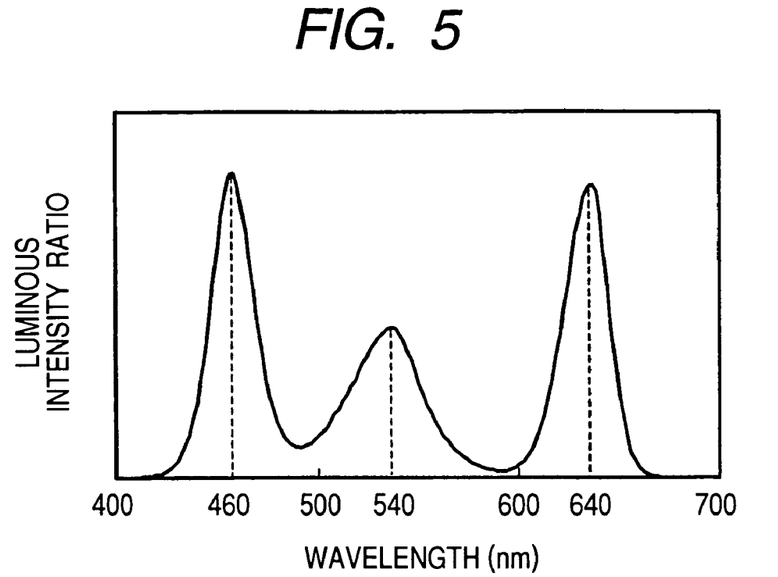
FIG. 5 illustrates luminescence peaks of a light source according to one embodiment of the present invention.

FIG. 5 illustrates luminous intensity of a light source used in this embodiment. Moreover, FIG. 5 illustrates light emitting wavelengths of each color, in which the luminous intensity ratios thereof are arbitrary. This is because the color temperature of the light source needs to be changed properly in order to set white balance as a liquid crystal display apparatus.

For this embodiment, an LED having a blue light luminescence peak around 460 nm, a green light luminescence peak around 540 nm, and a red luminescence peak around 640 nm is used.

The pixel configuration employed in this embodiment is similar to that of FIG. 1, in which only red and green have main pixels and sub-pixels while blue has only main pixels. In other words, the main pixel region 11 of the red pixel having high color purity contains the red colored sub-pixel region 14 having high transmittance in the red wavelength region with respect to the main pixel region 11 of the red pixel. Likewise, the main pixel region 12 of the green pixel having high color purity contains the green colored sub-pixel region 15 having high transmittance in the green wavelength region with respect to the main pixel region 12 of the green pixel. Meanwhile, the main pixel region 13 of the blue pixel having high color purity does not have a blue colored sub-pixel region.

In the pixel electrode configuration containing sub-pixels shown in FIG. 2, the linear electrode 23 applying an electric field to the liquid crystal layer is arrayed in a manner that the main pixel region 21 having high color purity is formed within ±15 degrees (+: in the clockwise direction with respect to the long side as 0, −: in the counterclockwise direction) with respect to the long side direction of the pixel, respectively, while the sub-pixel region 22 having high transmittance is formed at a tilt angle of −5 degree. Similar to the main pixel region 21, the blue pixel having the main pixel only forms multi domains within ±15 degrees.

Figure 6:
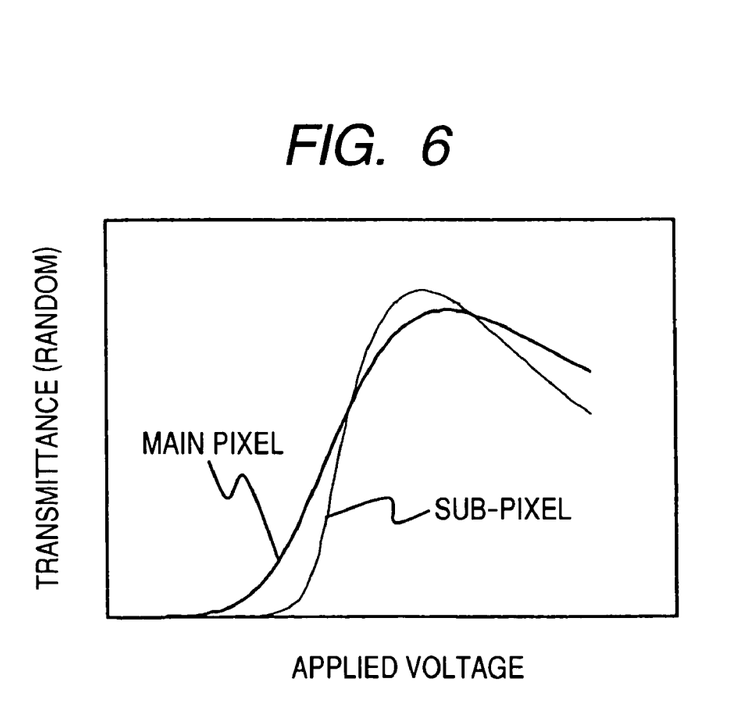
FIG. 6 is a conceptual diagram illustrating voltage-transmittance characteristics in main pixel and sub-pixel according to one embodiment of the present invention.

FIG. 6 illustrates a voltage-transmittance characteristic accompanying voltage application in the liquid crystal display panel of this embodiment. The voltage-transmittance relation in the sub-pixel, compared with that of the main pixel, shows a high threshold voltage and a steep slope. As such, main pixel characteristics are usually shown in the lower gray scale, and high brightness display in harmony with the sub-pixel becomes effective in the higher gray scale.

Figure 7:
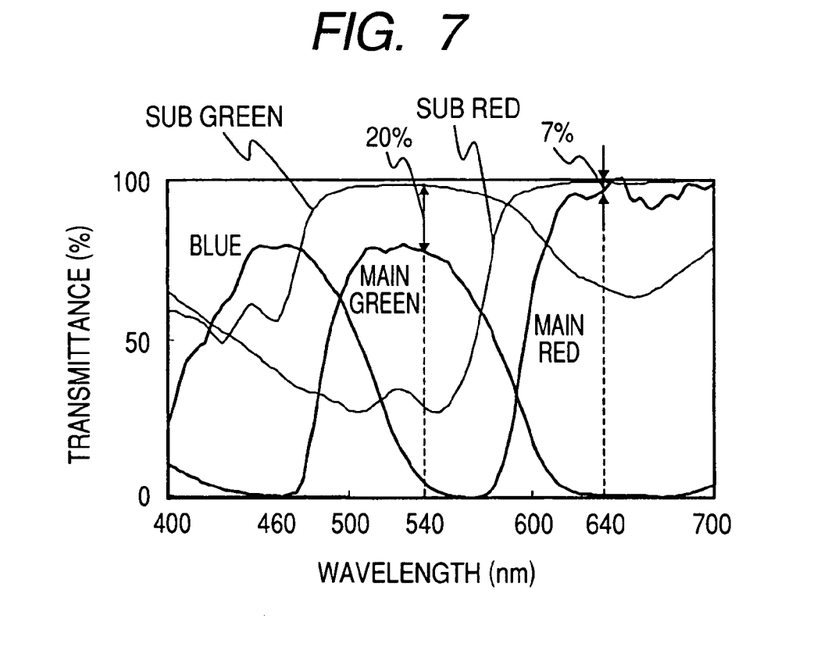
FIG. 7 illustrates spectral characteristics of a color filter according to one embodiment of the present invention.

FIG. 7 illustrates spectral characteristics of color filters of the main pixel and the sub-pixel. As shown in the drawing, at the red light luminescence peak 640 nm of the light source unit, transmittance of a red sub-pixel was higher than transmittance of a red main pixel by 7%. Similarly, at the green light luminescence peak 540 nm of the light source unit, transmittance of a green sub-pixel was higher than transmittance of a green main pixel by 20%.

For sub-pixels in this embodiment, a regist with low color concentration is used. Also, the area of each sub-pixel was set to 10% of a total area of a pixel unit composed of a main pixel and sub-pixels.

Before explaining the effects of this embodiment, as a comparative example, a configuration where RGB are formed in main pixels only will be described in reference to chromaticity diagram and white, RGB brightnesses shown in FIG. 8.

Figure 8:
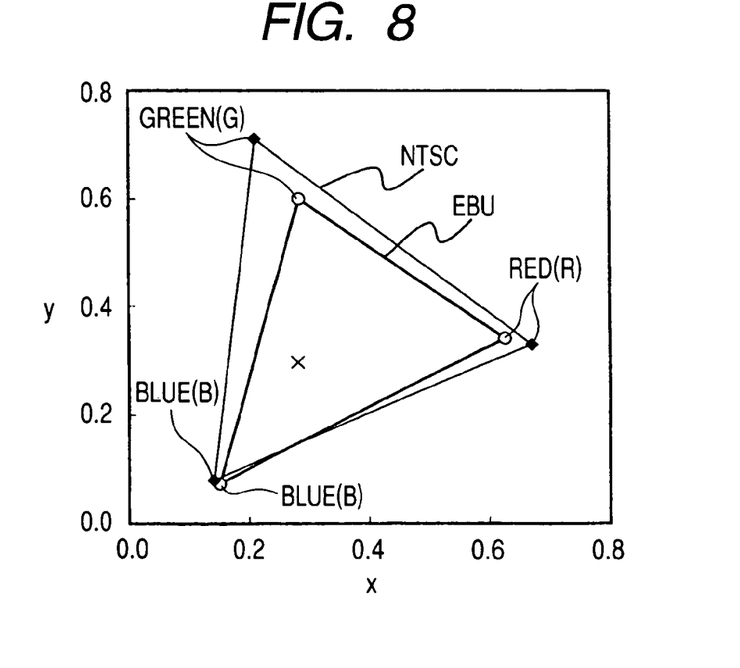
FIG. 8 is a conceptual diagram of a chromaticity range.

In general, as shown in FIG. 8, an EBU (European Broadcasting Union) signal used as a TV signal is composed of red (0.625, 0.340), green (0.285, 0.600) and blue (0.150, 0.075). In addition, there is an NTSC (National Television Standards Committee) signal which is a broadly-used chromaticity coordinate as a TV signal composed of red (0.670, 0.330), green (0.210, 0.710) and blue (0.140, 0.080). For use in TV, a composition that almost satisfies the EBU signal with 72% or 65% with respect to the NTSC signal composition is usually accepted.

As a typical example, a liquid crystal display was constituted by color filters used in main pixels and white balance was set to NTSC: NHK (0.283, 0.297). In addition, a white spot of NTSC: NHK follows the standards of a general white spot in Japanese TV broadcasting, and is indicated by 'x' in FIG. 8. A white spot of NTSC or EBU differs from this, so chromaticity of the light source needs to be optimized to meet the respective standards. For example, the chromaticity coordinates of red are set at (0.640, 0.321), green (0.290, 0.608) and blue (0.140, 0.075), which corresponds to 72% of NTSC. Moreover, when brightness of white display was set to 500 cd/m$^2$, brightness of red was about 100 cd/m$^2$, brightness of green was about 330 cd/m$^2$, and brightness of blue was about 60 cd/m$^2$, respectively.

In the typical liquid crystal display apparatus having a gradation of 31 (maximum gradation: 255), the chromaticity coordinates of red change to (0.429, 0.250), green change to (0.257, 0.440) and blue change to (0.160, 0.110), leading to substantial deterioration in color purity.

Moreover, in the case that the LED light source unit of this embodiment is employed in a general liquid crystal display panel (white spot is the same), the chromaticity coordinates off red in the 31 gradation change to (0.492, 0.268), green change to (0.224, 0.517), and blue change to (0.163, 0.124), showing an improvement in red and green. However, in high brightness display, the chromaticity coordinates of red lie within (0.684, 0.294), green (0.222, 0.685) and blue (0.139, 0.091), which are greater than color gamut of a TV signal. Thus, although the color gamut may be expanded by processing the TV signal, this is not absolutely required for recognizing the TV signal in colors close to real colors.

In the liquid crystal display apparatus according to this embodiment, chromaticity of the 31 gradation was enhanced, and brightness was also improved in accordance with color purity of a TV signal in the high brightness display. In detail, the chromaticity of the 31 gradation in the liquid crystal display apparatus in this embodiment was composed of red (0.56, 0.28), green (0.22, 0.58) and blue (0.15, 0.112), satisfying the EBU signal in high gradation also. In addition, the maximum brightness for white display was 650 cd/m$^2$, red 140 cd/m$^2$, green 400 cd/m$^2$, and blue 85 cd/m$^2$, showing a substantial improvement.

Moreover, white display used a light source having an equivalent brightness to that of the comparative example. In cases where such high brightness is not required, the light intensity of the light source may be lowered to achieve a low power consumption effect. Meanwhile, when an image signal requiring a brightness peak is inputted while the maximum light intensity of the light source is being maintained, an image engine performing high-brightness display may be employed to provide viewers with vivid, realistic images. In this embodiment having sub-pixels, an image data processing path is created to process or treat RGB three-color data being inputted as a TV signal. To this end, a look-up table for gradation was prepared for use in a signal processing circuit.

Embodiment 2

Figure 9:
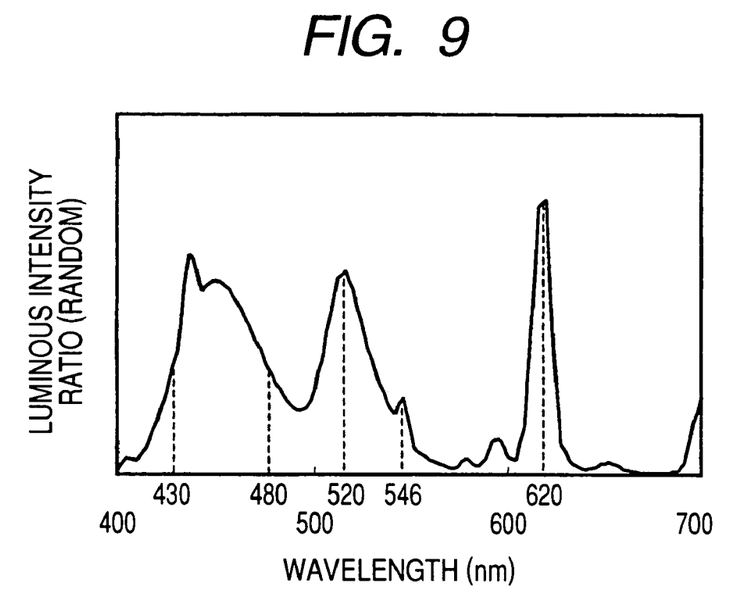
FIG. 9 is a diagram illustrating luminescence peaks of a light source according to one embodiment of the present invention.

In this embodiment, a cold cathode fluorescent lamp with narrow bandwidth fluorescent substance was used as a light source unit. Its emission characteristics are shown in FIG. 9. As shown in the drawing, a blue light luminescence peak is in a range of 430 to 480 nm, a green light luminescence peak is in a range of 520 to 546 nm, and a red light luminescence peak is around 620 nm. FIG. 9 also illustrates peak wavelengths, in which luminous intensity ratios at the respective wavelengths are not limited to those shown in the drawing. This is because the color temperature needs to be adjusted properly in accordance with the characteristics of a liquid crystal display panel being incorporated. A desired color temperature can be achieved by changing the composition ratio of a fluorescent substance. For instance, the fluorescent substance used in the cold cathode fluorescent lamp in this embodiment has red in $YVO_4$:Eu, green in $BaMgAl_{10}O_{17}$: Eu, Mn, and blue in $BaMgAl_{10}O_{17}$:Eu. By changing the composition ratio, it becomes possible to change the luminous intensity ratio and set a desired color temperature. Moreover, the fluorescent substance used in this embodiment is for illustrative purpose only. Needless to say, the same effect can be obtained by employing an appropriate fluorescent substance out of many that are available.

Figure 10:
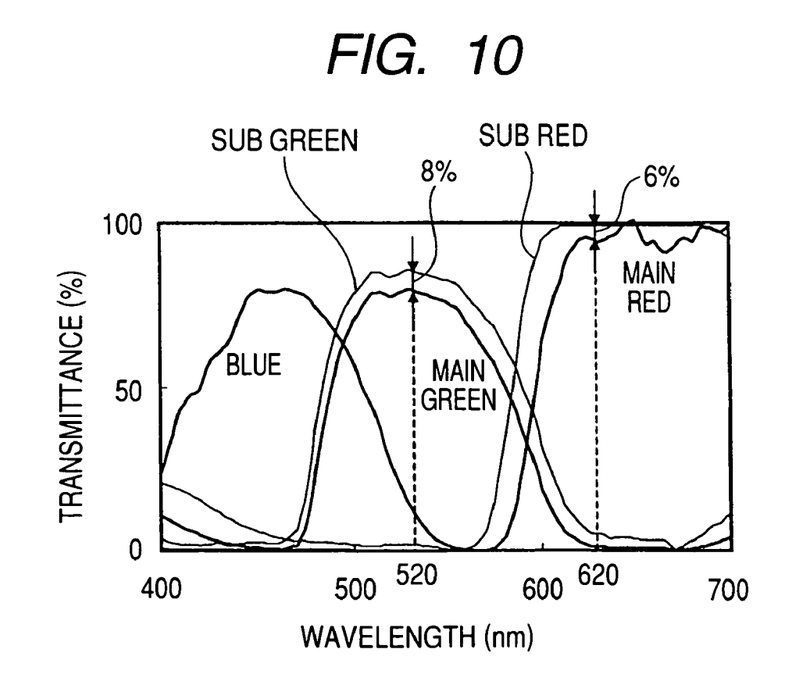
FIG. 10 illustrates spectral characteristics of a color filter according to one embodiment of the present invention.

FIG. 10 illustrates spectral characteristics of color filters of the main pixel and the sub-pixel. As shown in the drawing, transmittance of a red sub-pixel at the red light luminescence peak 620 nm of the light source unit was higher than transmittance of a red main pixel by 6%. Similarly, transmittance of a green sub-pixel at the green light luminescence peak 520 nm was higher than transmittance of a green main pixel by 8%. When forming a color filter, a half exposure process was conducted to make the film thickness of a sub-pixel thinner than that of a main pixel. The area of the sub-pixel was set to 8% with respect to the red pixel (a total area of pixel unit composed of a main pixel and sub-pixels) and 10% with respect to the green pixel.

In the liquid crystal display apparatus according to this embodiment, chromaticity of the 31 gradation was enhanced, and brightness was also improved in accordance with color purity of a TV signal in the high brightness display. In detail, the chromaticity of the 31 gradation in the liquid crystal display apparatus in this embodiment was composed of red (0.56, 0.31), green (0.26, 0.58) and blue (0.16, 0.112), satisfying the EBU signal in high gradation also. In addition, the maximum brightness for white display was 650 $cd/m^2$, red 140 $cd/m^2$, green 400 $cd/m^2$, and blue 85 $cd/m^2$, showing a substantial improvement.

Embodiment 3

Figure 11:
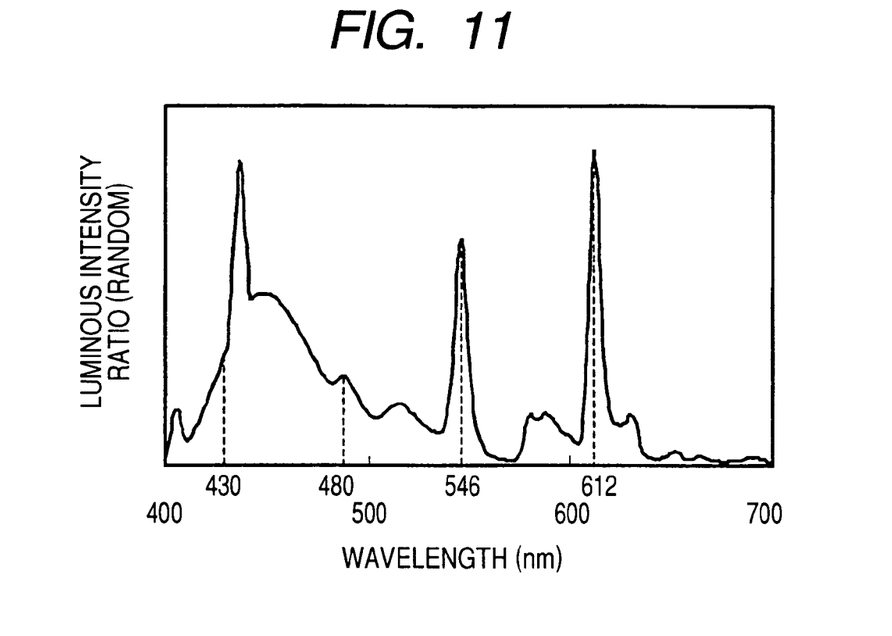
FIG. 11 is a diagram illustrating luminescence peaks of a light source according to one embodiment of the present invention.

In this embodiment, a cold cathode fluorescent lamp with narrow bandwidth fluorescent substance was used as a light source unit. Its emission characteristics are shown in FIG. 11. As shown in the drawing, a blue light luminescence peak is in a range of 430 to 480 nm, a green light luminescence peak is around 546 nm, and a red light luminescence peak is around 612 nm. FIG. 11 also illustrates peak wavelengths, in which luminous intensity ratios at the respective wavelengths are not limited to those shown in the drawing. This is because the color temperature needs to be adjusted properly in accordance with the characteristics of a liquid crystal display panel being incorporated. A desired color temperature can be achieved by changing the composition ratio of a fluorescent substance. Moreover, the fluorescent substance used in this embodiment is for illustrative purpose only. Needless to say, the same effect can be obtained by employing an appropriate fluorescent substance.

Figure 12:
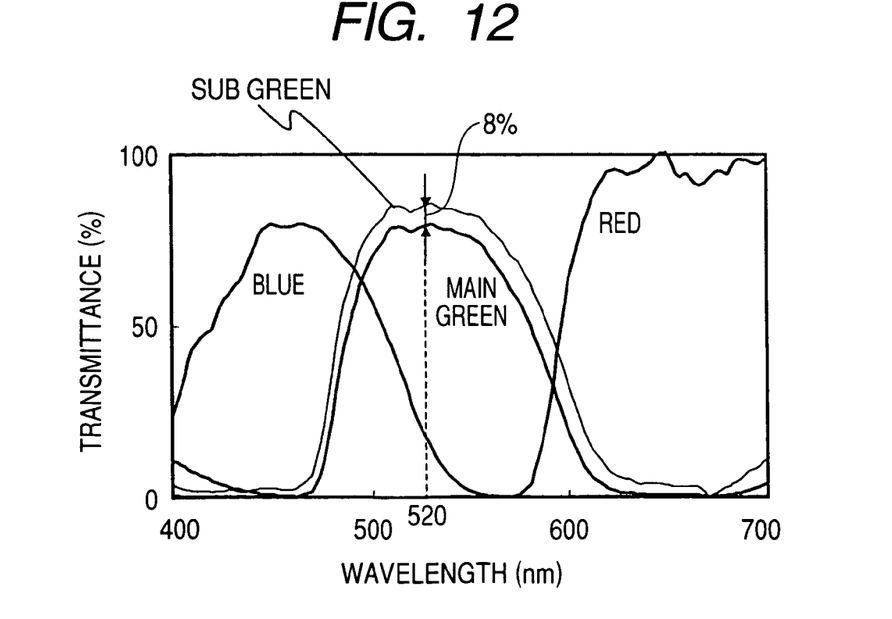
FIG. 12 illustrates spectral characteristics of a color filter according to one embodiment of the present invention.

FIG. 12 illustrates spectral characteristics of color filters of the main pixel and the sub-pixel. In this embodiment, only green had sub-pixels. As shown in the drawing, transmittance of a green sub-pixel at the green light luminescence peak 520 nm was higher than transmittance of a green main pixel by 8%. When forming a color filter, a half exposure process was conducted to make the film thickness of a sub-pixel thinner than that of a main pixel. The area of the sub-pixel was set to 15% with respect to the red pixel (a total area of pixel unit composed of a main pixel and sub-pixels) and 10% with respect to the green pixel.

In the liquid crystal display apparatus according to this embodiment, chromaticity of the 31 gradation was enhanced, and brightness was also improved in accordance with color purity of a TV signal in the high brightness display. In detail, the chromaticity of the 31 gradation in the liquid crystal display apparatus in this embodiment was composed of red (0.47, 0.27), green (0.25, 0.49) and blue (0.16, 0.11), satisfying the EBU signal in high gradation also. In addition, the maximum brightness for white display was 560 $cd/m^2$, red 145 $cd/m^2$, green 290 $cd/m^2$, and blue 85 $cd/m^2$, showing a substantial improvement.

Embodiment 4

Figure 13A:
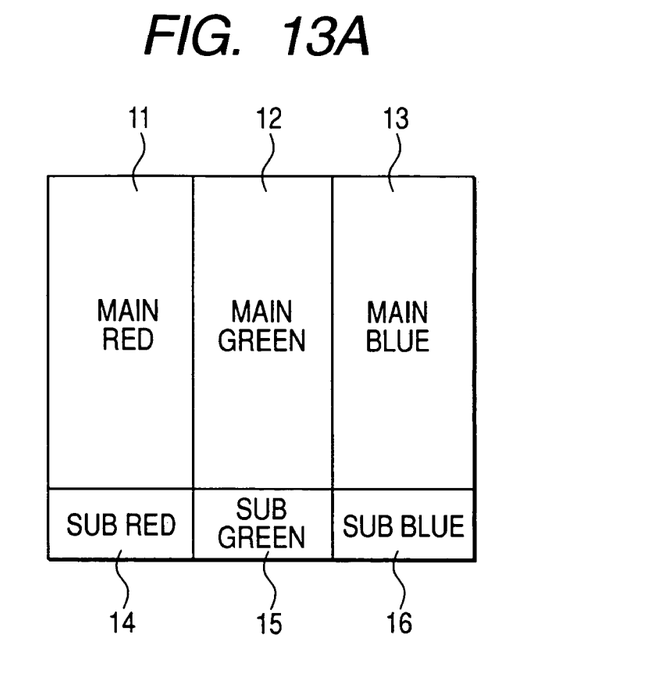
FIG. 13 is a schematic diagram illustrating a pixel configuration and wiring according to one embodiment of the present invention.

In this embodiment, as shown in FIG. 13A, a blue sub-pixel region 16 having high transmittance at a blue wavelength region was added to a blue main pixel region 13.

Figure 13B:
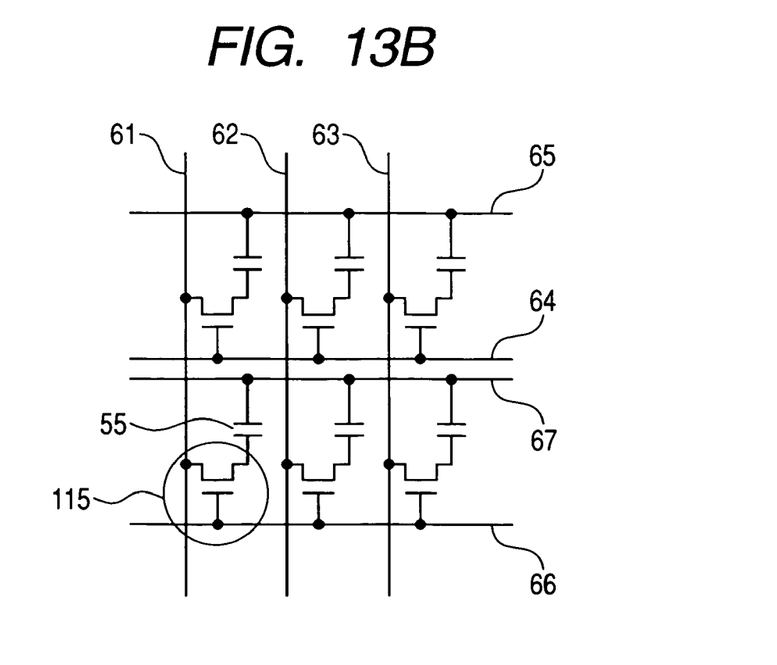

In addition, as shown in FIG. 13B, electrodes were wired to be able to operate individually by a thin film transistor 115. By configuring independent pixels, the tilt angle on the linear electrode was within ±15 degrees for both main pixel and sub-pixel. For wiring of each pixel, as shown in FIG. 13B, there are two gate wirings 64 and 66, and two common wirings 65 and 67. When a given voltage is applied to the first gate wiring 66, the voltage enters from a red source wiring 61 to the red main pixel 11, from a green source wiring 62 to the green main pixel 12, and from a blue source wiring 63 to the blue main pixel 13, respectively. Meanwhile, when a given voltage is applied to the second gate wiring 64, a voltage from the respective source wirings is applied to the red sub-pixel 14, the green sub-pixel 15, and the blue sub-pixel 16.

As this embodiment includes the gate wirings, blue pixels also contain sub-pixels, and each sub-pixel is given the same area. However, the color filter of the blue sub-pixel has the same spectral characteristics as those of the main pixel. Therefore, this embodiment is characterized in that although it is composed of sub-pixels electrically, it only includes main pixels optically. The light source unit and color filter characteristics are same as those in Embodiment 1. The area of a sub-pixel was set to 20% of the area of a main pixel.

Figure 14:
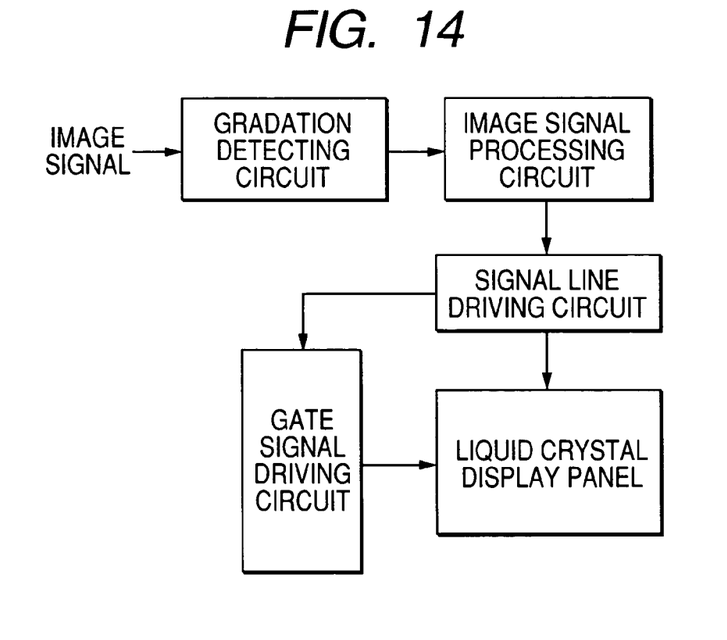
FIG. 14 is a block diagram showing an image signal processing procedure according to one embodiment of the present invention.

Depending on input brightnesses, image data process in this embodiment is divided into a main pixel display and main and sub-pixel display. In this embodiment, only main pixels were driven up to gradation 97 (maximum gradation: 255) and sub-pixels were driven for the rest. FIG. 14 illustrates an example for processing an image signal by detecting the gradation.

In this embodiment, the maximum brightness for white display was 630 $cd/m^2$, red 150 $cd/m^2$, green 390 $cd/m^2$, and blue 87 $cd/m^2$. In 31 gradation, the chromaticity coordinates of red were set at (0.535, 0.273), green (0.223, 0.560) and blue (0.154, 0.116), Embodiment 5

Figure 15:
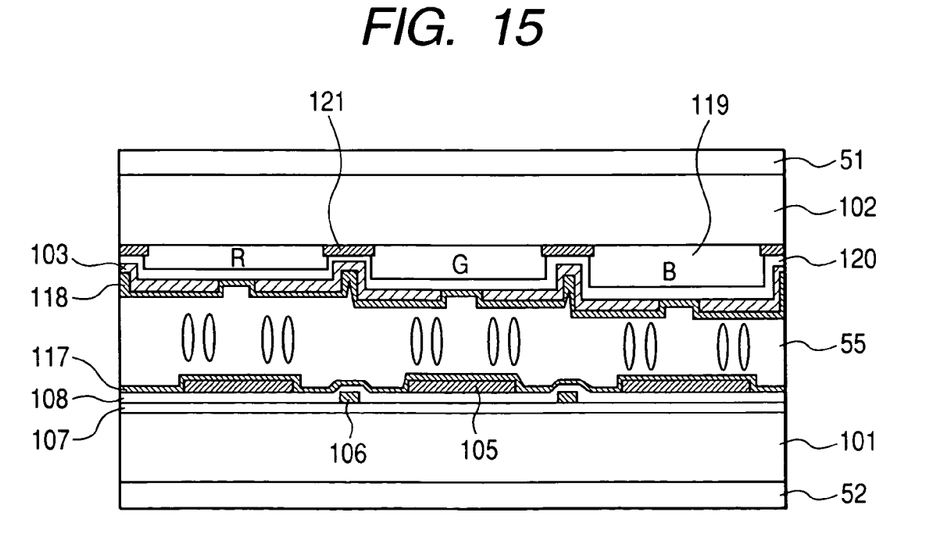
FIG. 15 is a schematic diagram illustrating an example of a liquid crystal panel structure according to the present invention.

This embodiment has the same configuration as Embodiment 4, except that the vertical alignment mode shown in FIG. 15 was used for the liquid crystal display mode and that a red sub-pixel area was set to 10% of its main pixel. The following will now briefly explain the fabrication of a vertical alignment mode type liquid crystal panel. However, as the fabrication procedure below follows the standard method, the present invention is not to be limited thereto.

First, for a color filter substrate, chrome and chromium oxide films were applied to a 0.7 mm thick non-alkali glass substrate 102 to a thickness of 160 nm and 40 nm, respectively. Then, a positive type regist was coated thereon and went through the pre-baking, exposure, development, etching, separating, and rinsing processes to form a black matrix 121.

Next, a color filter 119 was formed using diverse color regists manufactured by Fujifilm Arch Co., Ltd., following standard photolithography which involves coating, pre-baking, exposure, developing, rinsing, and post-baking processes. Even though in this embodiment film thickness of the main pixel was set to 2.5 μm for red, 2.7 μm for green, 2.9 μm for blue, and film thickness of the sub-pixel was set to 2.2 μm for red and 2.4 μm for green, the thickness of each can be adjusted appropriately depending on a desired color purity or a thickness of the liquid crystal layer.

Next, an overcoat layer 120 was formed using V-259 manufactured by Nippon Steel Chemical Co., Ltd. The over coat layer was exposed under high-pressure mercury lamp i-rays at the intensity of 200 mJ/cm$^2$ of light radiation, and heated at 230° C. for 30 minutes. The resulting film thickness on a color pixel ranged from about 1.2 μm to 1.5 μm.

Next, an ITO was vacuum-deposited by sputtering to a thickness of 140 nm, and heated at 240° C. for 90 minutes to be crystallized. Then, it went through photolithography and etching processes to form the pattern of a common electrode 103. An opening of the common electrode 103 has an opening of the pixel electrode 105 inserted therein.

Next, a pillar shaped spacer as high as 3.8 which was formed on the black matrix interposed between blue pixels, by carrying out standard photolithography and etching process on a photosensitive resin.

In addition, a scan electrode (gate electrode) (not shown) made of Mo/Al was formed on a 0.7 mm thick non-alkali glass substrate 101 functioning as an active matrix substrate. A storage capacitance electrode (not shown) may be formed with chrome or aluminum on the same layer. A gate insulator 107 was formed to cover these, and then a source (drain electrode) 106 and a thin film transistor (not shown) were formed. In order to protect these, a protection insulator 108 was formed and a pixel electrode 105 having an open pattern was formed thereon using ITO. A transparent conductor such as IZO may also be used. As a result, the active matrix substrate composed of 1024×3×768 pixels, that is, the source electrode with 1024×3 pixels (corresponding to RGB) and the scan electrode 104 with 768 pixels was obtained.

Next, vertically aligned alignment layers 117 and 118 were formed on the active matrix substrate and the color filter substrate, respectively. Then, a sealing agent was coated onto the peripheral portions of these substrates, and a liquid crystal material having negative dielectric anisotropy was dropped by ODF method to seal the substrates. In this manner, a desired liquid crystal panel was assembled.

For polarizing plates 51 and 52, the transmission axis of the incident side polarizing plate 51 was set in parallel to the long side direction of the substrate while the transmission axis of the emission side polarizing plate 52 was set in parallel to the short side direction of the substrate, while intersecting the transmission axes to each other. For the polarizing plates, optical compensated polarizers equipped with birefringent films capable of compensating an optical characteristic, e.g., wide viewing angle, were employed.

Lastly, a driving circuit and a backlight unit were connected as a liquid crystal module, and a desired liquid crystal display apparatus was achieved. For the backlight unit, an LED was used.

Although this embodiment introduced a PVA mode liquid crystal display apparatus using an ITO cut pattern, if an MVA mode liquid crystal display having projections formed on the color filter substrate was to be fabricated, the projection formation process should be carried out after forming the ITO and before forming the pillar-shaped spacer. The formation of an anisotropy layer is done by following the same procedure as this embodiment.

Depending on input brightnesses, image signal process in this embodiment is divided into a main pixel display and main and sub-pixel display. In this embodiment, only main pixels were driven up to gradation 107 (maximum gradation: 255). For higher gradation, image signals were processed so that sub-pixels were driven.

Figure 16:
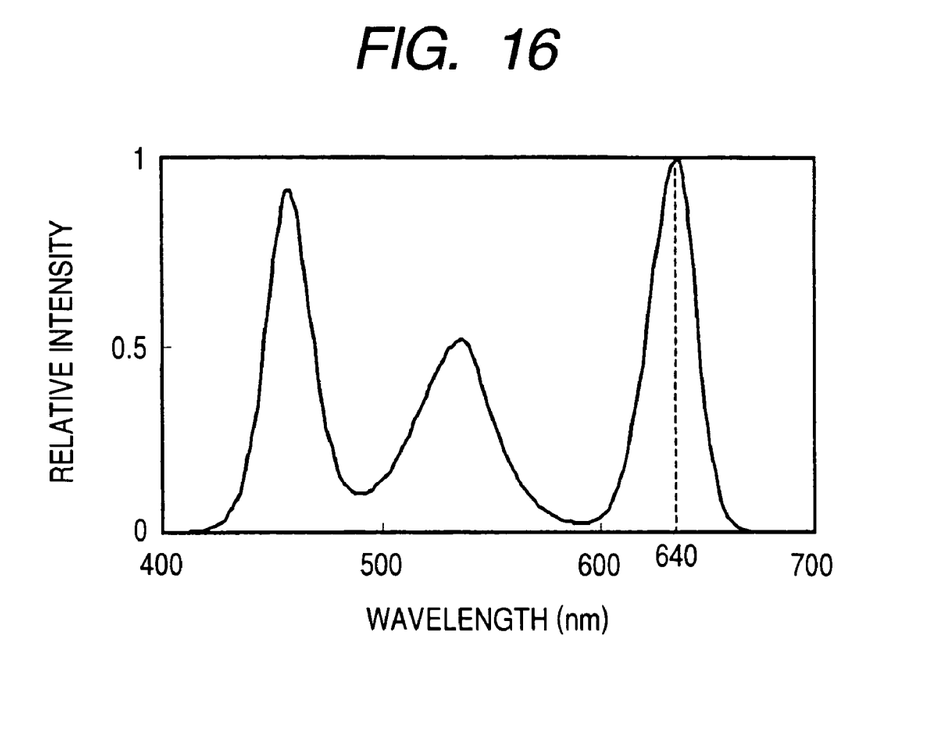
FIG. 16 is a diagram illustrating luminescence peaks of a light source according to one embodiment of the present invention.

FIG. 16 illustrates spectroscopic intensity of the backlight unit according to this embodiment. To be in harmony with the spectrum of the liquid crystal layer, LED intensity of red light is stronger than that of Embodiment 1. In other words, the backlight spectrum can be adjusted properly according to a liquid crystal panel being used.

In this embodiment, the maximum brightness for white display was 470 cd/m$^2$, red 120 cd/m$^2$, green 250 cd/m$^2$, and blue 75 cd/m$^2$. In 31 gradation, the chromaticity coordinates of red were set at (0.530, 0.280), green (0.232, 0.552) and blue (0.164, 0.125),

What is claimed is:

1. A transmissive type liquid crystal display apparatus comprising:
   a pair of substrates;
   a pair of polarizing plates disposed on opposite sides of the pair of substrates;
   a liquid crystal layer sandwiched between the pair of substrates;
   an electrode group formed on at least one of the substrates for applying an electric field to the liquid crystal layer;
   a light source disposed on an outside of the pair of substrates;
   wherein a pixel unit includes at least three pixels of red, green, and blue, and a sub-pixel region divided by optical characteristics is formed in at least one region of the pixels;
   wherein at least one of the three pixels of red, green, and blue includes a main pixel region having a first color filter for a main pixel and a sub-pixel region having a second color filter for a sub-pixel;
   wherein the first color filter for the main pixel has higher color purity than that of the second color filter for the sub-pixel;
   wherein the second color filter for the sub-pixel exhibits the same peak wavelength as that of the first color filter for the main pixel, and has a transmittance at the same peak wavelength which is higher than that of the first color filter for the main pixel;
   wherein a threshold voltage of the sub-pixel is higher than a threshold voltage of the main pixel;
   wherein, during an in-plane switching display mode, at least one electrode of the electrode group is a linear electrode extending into the main pixel region and the sub-pixel region;
   wherein the linear electrode in the main pixel region has a first flexion angle and a second flexion angle, and the linear electrode in the sub-pixel region has a third flexion angle;
   wherein the linear electrode has a first bending angle formed by the first flexion angle and the second flexion angle in the main pixel region, and a second bending angle formed by the second flexion angle and the third flexion angle in a vicinity of a border between the main pixel region and the sub-pixel region; and wherein the flexion angle is an angle between the long side of the pixel and the extending direction of the linear electrode;

so that a threshold voltage of the liquid crystal layer shifts to a high voltage side, making an increase in transmittance with respect to the voltage of the liquid crystal layer in the sub-pixel region larger than an increase in transmittance with respect to the voltage of the liquid crystal layer in the main pixel region.

2. The apparatus according to claim 1, wherein a light emitting diode is used as the light source, which has at least one strong luminescence peak in a blue light wavelength range of 400 to 490 nm, in a green light wavelength range of 510 to 570 nm, and in a red light wavelength range of 600 to 700 nm, respectively; and wherein the main pixel region of the green pixel includes the first color filter and the sub-pixel region of the green pixel includes the second color filter, and a transmittance of the first color filter of the main pixel region of the green pixel is lower than a transmittance of the second color filter of the sub-pixel region of the green pixel in the green light wavelength range.

3. The apparatus according to claim 1, wherein a light emitting diode is used as the light source, which has at least one strong luminescence peak in a blue light wavelength range of 400 to 490 nm, in a green light wavelength range of 510 to 570 nm, and in a red light wavelength range of 600 to 700 nm, respectively, and wherein the main pixel region of the red pixel includes the first color filter and the sub-pixel region of the red pixel includes the second color filter, and a transmittance of the first color filter of the main pixel region of the red pixel is lower than a transmittance of the second color filter of the sub-pixel region of the red pixel in the red light wavelength range.

4. The apparatus according to claim 1, wherein a light emitting diode is used as the light source, which has at least one strong luminescence peak in a blue light wavelength range of 400 to 490 nm, in a green light wavelength range of 510 to 570 nm, and in a red light wavelength range of 600 to 700 nm, respectively, and wherein the main pixel regions of the green pixel and the red pixel include the first color filters and the sub-pixel region of the green pixel and the red pixel include the second color filters, and transmittances of the first color filters of the main pixel region of the green pixel and the main pixel region of the red pixel are lower than corresponding transmittances of the second color filters of the sub-pixel region of the green pixel and the sub-pixel region of the red pixel in the green light wavelength and the red light wavelength ranges respectively.

5. The apparatus according to claim 1, wherein an area of the sub-pixel is 20% or less than an area of the pixel including the main pixel and the sub-pixel.

6. The apparatus according to claim 1, wherein an electric field application to the liquid crystal layer is carried out in an in-plane switching mode.

7. The apparatus according to claim 1, wherein a film thickness of the first color filter in the main pixel is bigger than a film thickness of the second color filter in the sub-pixel.

8. The apparatus according to claim 1, wherein the blue pixel has only the main pixel region and does not have the sub-pixel region.

9. The apparatus according to claim 1, wherein the pixel unit electrically includes six pixels.

10. The apparatus of claim 9, wherein a light emitting diode is used as the light source, which has at least one strong luminescence peak in a blue light wavelength range of 400 to 490 nm, in a green light wavelength range of 510 to 570 nm, and in a red light wavelength range of 600 to 700 nm, respectively; and wherein the first color filter of the main pixel region and the second color filter of the sub-pixel region of the blue pixel are substantially optically identical.

11. The apparatus according to claim 9, wherein a light emitting diode is used as the light source, which has at least one strong luminescence peak in a blue light wavelength range of 400 to 490 nm, in a green light wavelength range of 510 to 570 nm, and in a red light wavelength range of 600 to 700 nm, respectively, and wherein the main pixel region of the green pixel and the main pixel region of the red pixel include the first color filters and the sub-pixel region of the green pixel and the sub-pixel region of the red pixel include the second color filters, and a transmittance of the first color filters of the main pixel region is lower than a corresponding transmittance of the second color filters of the sub-pixel region in the green light wavelength and the red light wavelength ranges respectively.

12. The apparatus according claim 11, wherein an area of the sub-pixel is 20% or less than an area of the pixel including the main pixel and the sub-pixel.

13. The apparatus according to claim 9, wherein a cold cathode fluorescent lamp is used as the light source, which has at least one strong luminescence peak in a blue light wavelength range of 430 to 480 nm, in a green light wavelength range of 510 to 560 nm, and in a red light wavelength range of 620 to 680 nm, respectively, and wherein the main pixel region of the green pixel includes the first color filter and the sub-pixel region of the green pixel includes the second color filter, and a transmittance of the first color filter of the main pixel region of the green pixel is lower than a transmittance of the second color filter of the sub-pixel region of the green pixel in the green light wavelength range.

14. The apparatus according to claim 9, wherein a cold cathode fluorescent lamp is used as the light source, which has at least one strong luminescence peak in a blue light wavelength range of 430 to 480 nm, in a green light wavelength range of 510 to 560 nm, and in a red light wavelength range of 620 to 680 nm, respectively, and wherein the main pixel region of the red pixel includes the first color filter and the sub-pixel region of the red pixel includes the second color filter, and a transmittance of the first color filter of the main pixel region of the red filter is lower than a transmittance of the second color filter of the sub-pixel region of the red pixel in the red light wavelength range of the light source.

15. The apparatus according to claim 9, wherein the main pixel and the sub-pixel are operated independently.

16. The apparatus according to claim 9, wherein a film thickness of the first color filter in the main pixel is bigger than a film thickness of the second color filter in the sub-pixel.

\* \* \* \* \*